(12) United States Patent
Assa et al.

(10) Patent No.: US 9,712,396 B2
(45) Date of Patent: Jul. 18, 2017

(54) TOPOLOGY CONFIGURATION OF PROCESSING ELEMENTS ARRAY BY USING PACKETS

(71) Applicant: Avago Technologies General IP (Singapore) Pte. Ltd., Singapore (SG)

(72) Inventors: Michael Assa, Kfar Saba (IL); Daniel Shterman, Petach Tikva (IL)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 200 days.

(21) Appl. No.: 14/719,852

(22) Filed: May 22, 2015

(65) Prior Publication Data

US 2016/0323174 A1 Nov. 3, 2016

Related U.S. Application Data

(60) Provisional application No. 62/153,705, filed on Apr. 28, 2015.

(51) Int. Cl.
*H04L 12/28* (2006.01)
*H04L 12/24* (2006.01)
*H04J 1/16* (2006.01)

(52) U.S. Cl.
CPC .......... *H04L 41/12* (2013.01); *H04L 41/0803* (2013.01)

(58) Field of Classification Search
USPC ................. 370/252, 362, 369, 386
See application file for complete search history.

(56) References Cited

U.S. PATENT DOCUMENTS 5,574,849 A * 11/1996 Sonnier ............ G01R 31/31727
   711/E12.026
8,687,629 B1 * 4/2014 Kompella ........... H04L 49/1515
   370/386

* cited by examiner

*Primary Examiner* — John Pezzlo
(74) *Attorney, Agent, or Firm* — Foley & Lardner LLP

(57) ABSTRACT

In some aspects, the disclosure is directed to methods and systems for topology configuration of an array of packet processing elements via a topology configuration packet. Each processing element may include input packet busses from a first plurality of neighboring processing elements and output packet busses to a second plurality of neighboring processing elements. Each processing element may receive the configuration packet from one of the first plurality of neighboring elements, set its own topology configuration register according to predetermined values within the packet, and forward the packet out all of its outputs, in the same manner as a standard packet.

20 Claims, 12 Drawing Sheets

TOPOLOGY CONFIGURATION OF PROCESSING ELEMENTS ARRAY BY USING PACKETS

RELATED APPLICATIONS

This application claims priority to and the benefit of U.S. Provisional Patent Application No. 62/153,705, filed Apr. 28, 2015. The entire contents of the foregoing are hereby incorporated herein by reference for all purposes.

FIELD OF THE DISCLOSURE

This disclosure generally relates to systems and methods for configuration of packet processing topologies within processing element arrays.

BACKGROUND OF THE DISCLOSURE

For speed and processing efficiency, data packets may be processed by an array of processing elements, with various processing elements performing similar or different functions. For example, some processing elements may perform encryption; other elements may perform compression; still other elements may apply filtering policies or data calculations; etc. These arrays may be configured with a hard-wired or fixed topology, with all packets travelling from element to element in a predetermined path. However, this reduces flexibility and adds manufacturing expense where different configurations are needed.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for configuration of packet processing topologies within processing element arrays; and Section B describes a network environment and computing environment which may be useful for practicing embodiments described herein.

A. Configuration of Packet Processing Topologies within Processing Element Arrays Data packets, including network packets as well as packetized data communicated between applications and/or an operating system of a device, may be processed efficiently by arrays of processing elements. By incorporating multiple processing elements, each element may perform dedicated functions in a more efficient manner and/or multiple packets may be processed simultaneously by the array, with each element processing a portion of the packet or performing a specific function on the packet before passing the packet on to the next processing element.

Figure 1A:
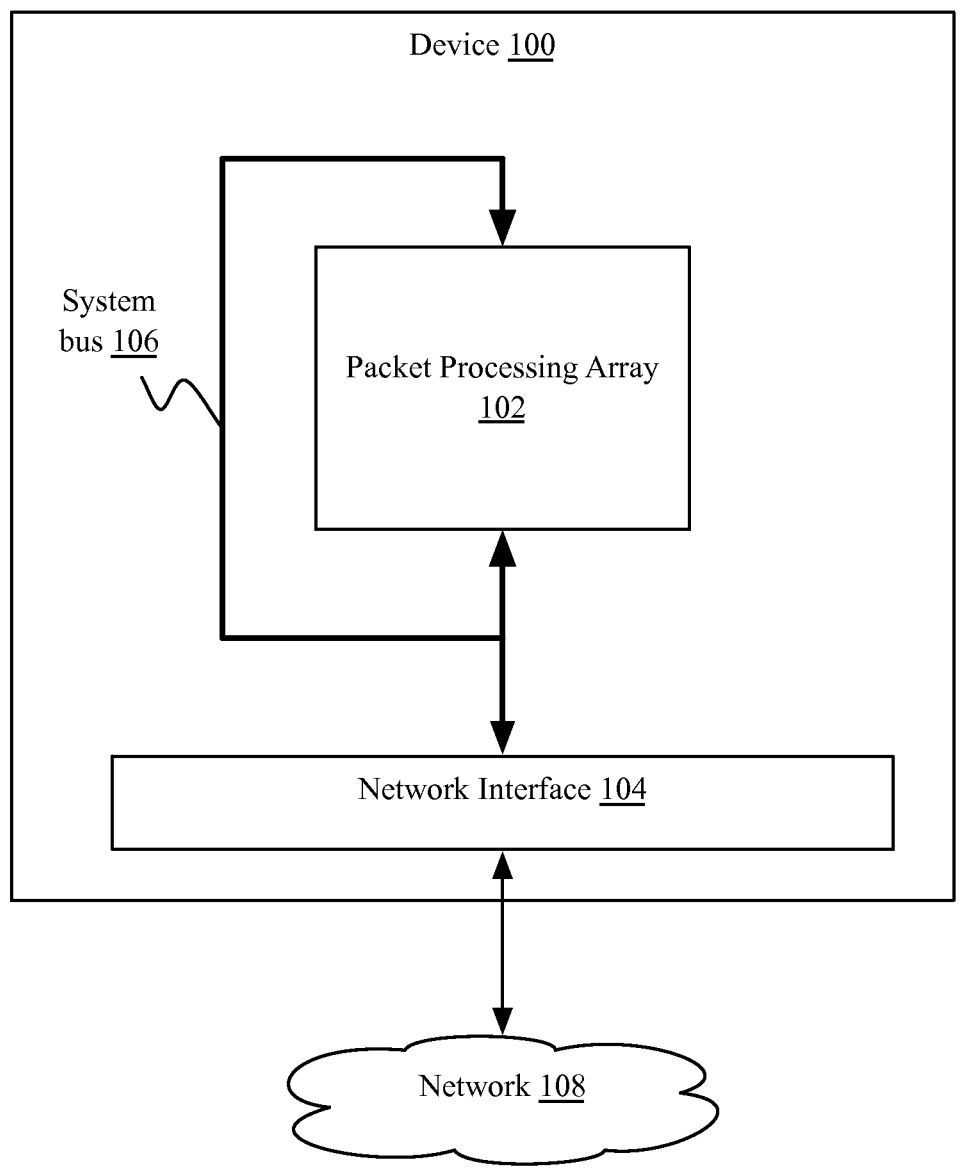
FIG. 1A is a block diagram of an implementation of a device including a packet processing array.

FIG. 1A is a block diagram of an implementation of a device including a packet processing array. A device 100 may be any type of computing device, such as a laptop computer, desktop computer, tablet computer, smart phone, wearable computer, server, router, gateway, firewall, network switch, embedded control system, or any other type and form of device. Device 100 may include a packet processing array 102 connected to a system bus 106, and, in some implementations, a network interface 104 in communication with a network 108. In other implementations, device 100 may not include a network interface 104, and the packet processing array 102 may process packets internally distributed within device 100. Device 100 may also include other components, such as one or more processors, memory devices, input/output devices or interfaces, etc., discussed in more detail below in connection with section B.

In implementations including a network interface 104 in communication with a network 108, the network interface may be any type and form of interface, such as a wireless interface, wired interface, cellular interface, BLUETOOTH or near field communication (NFC) interface, or any other interface. The network 108 may comprise a wide area network such as the Internet, local area network, virtual private network, peer to peer or mesh network, or any other type and form of network. In many implementations, the network 108 may comprise a plurality of interconnected networks, such as a local network connected via a gateway to a wide area network. Although only one network interface 104 is illustrated, in many implementations, device 100 may include a plurality of network interfaces. Although shown separate, in some implementations, the packet processing array 102 may be part of the network interface 102.

System bus 106 may provide packets to and/or receive packets from the packet processing array 102. System bus 106 may be any type and form of bus, including a PCI bus, DMA channel, or any other type and form of bus. In some implementations and discussed in more detail below, a system bus 106 may connect an output of the packet processing array 102 to an input of the array, allowing multiple passes through the array for a packet.

Figure 1B:
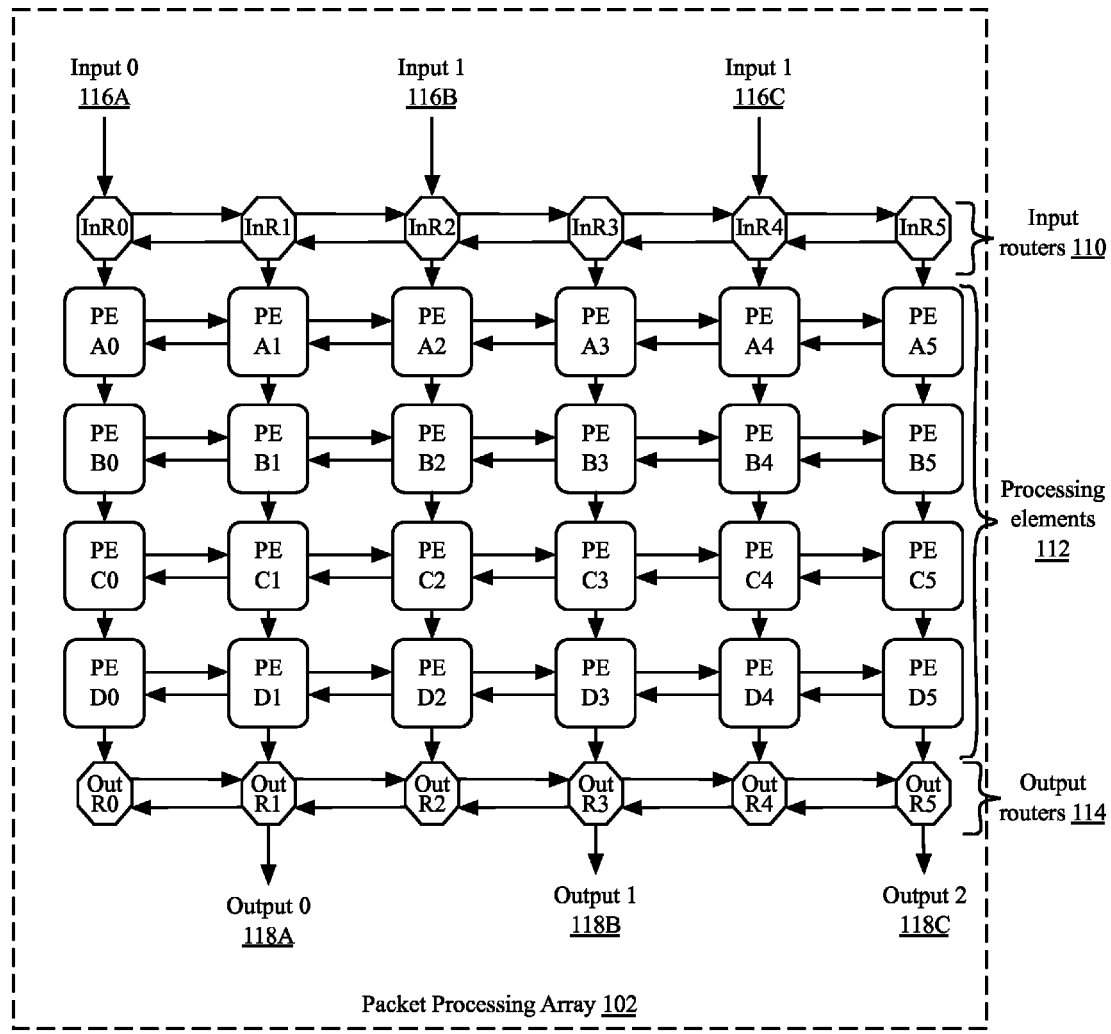
FIG. 1B is a block diagram of an implementation of a dynamically configurable packet processing array.

FIG. 1B is a block diagram of an implementation of a dynamically configurable packet processing array 102. The packet processing array 102 may comprise one or more input routing elements or routers 110, one or more output routing elements or routers 114, and/or one or more processing elements 112. In some implementations, routers 110, 114, and processing elements 112 may be of different types, or may include the same hardware but perform different functions (e.g. routing, decryption, decompression, encryption, compression, filtering, analysis or scanning, modification, etc.). In other implementations, routers 110, 114 and processing elements 112 may be of different types, though with identical topology logic systems. In still other implementations, processing elements 112 may be of different types from each other: for example, processing elements in row A may perform decryption functions, processing elements in row B may perform decompression functions, etc.

The array may be of any size, up to 10×10 or larger. Although primarily discussed in terms of two-dimensional arrays, in some implementations, arrays may be three-dimensional, and include connections between layers of the array. In some implementations, the arrays may have a hard-wired topology, with all packets taking a predetermined path through the array.

However, this reduces flexibility and may increase manufacturing costs where different topologies are required. Accordingly, in many implementations, the array may be dynamically reconfigurable for different applications. As shown in FIG. 1B, a reconfigurable array may include multiple connections between routers 110, 114, and processing elements 112. In one implementation, the routers 110, 114, and processing elements 112 may be configured to transmit or provide packets on all outgoing connections (e.g. connections to the left, right, or down, in the implementation illustrated in FIG. 1B), and may selectively receive packets on one incoming connection of the plurality of possible incoming connections (e.g. connections from the left, right, or above). This prevents potential loops or echos between elements. In a similar implementation, routers 110, 114, and processing elements 112 may be configured to receive packets from any incoming connection, but selectively provide packets only on a single outgoing connection. In still another implementation, routers 110, 114, and processing elements 112 may be configured to selectively receive packets from one or more incoming connections and selectively provide packets to one or more outgoing connections.

As shown, in some implementations, an array 102 may include a plurality of inputs 116A-C and a plurality of outputs 118A-C. This may allow use of the array by several packet flows simultaneously. In other implementations, an output 118 may be connected directly to an input 116 (or via a system bus 106), allowing a flow to traverse the array multiple times, depending on the processing steps required.

Figure 1C:
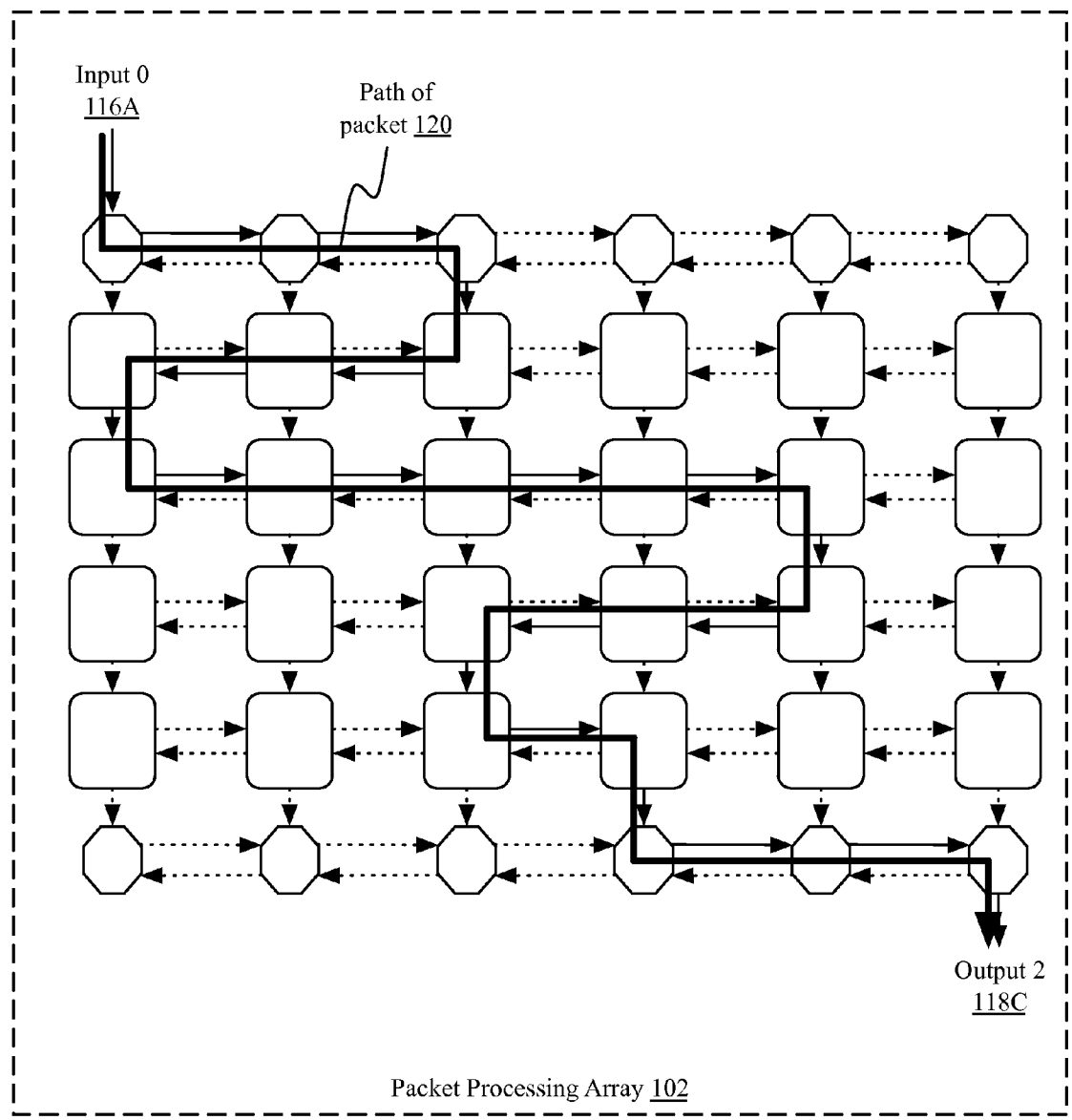
FIG. 1C is a block diagram illustrating packet flow in one configuration of the implementation of a dynamically configurable packet processing array of FIG. 1B.

FIG. 1C is a block diagram illustrating packet flow 120 in one configuration of the implementation of a dynamically configurable packet processing array of FIG. 1B. As shown, the packet may travel horizontally to the left or right and vertically downwards within the array through multiple elements in the same row or column. As discussed above, after processing the packet, each processing element may provide the packet to the left, right, and downwards (not illustrated). However, each processing element may be configured to only receive the packet from one neighbor (e.g. left, right, or above), resulting in a single flow path 120 with no loops or echos. Processing elements may simply ignore packets received from neighbors other than the selected or preferred neighbor.

The topology of dynamically configurable processing arrays may be configured by using a host interface connected to each processing element. However, this can quickly grow very large. For example, given a two-bit interface to each processing element (to allow selection of a left, right, or top input), a 10×10 array requires 200 separate input busses, resulting in increased expense and size. The complexity of the physical layout of processing elements is also increased, due to the additional busses that need to be connected to every element. Reconfiguration via a host interface may also be slow, with the host interface operating serially on each processing element in turn.

Instead, a special topology configuration packet may be provided to the array and distributed to every processing element, in some implementations. In other implementations, the topology configuration packet may be distributed to some of the elements, such as elements relevant for the resulting configured path or flow. The packet may include specific topology configuration instructions for each element, and each element may extract its corresponding configuration instructions and configure a multiplexer to properly select input packets. Accordingly, a single packet may reconfigure the array, reducing setup or reconfiguration time, and without requiring additional interfaces.

In one implementation, a specially configured topology configuration packet may be provided to the array and distributed to every element in a cascading manner. The topology configuration packet may include a long string of bits (e.g. two for each processing element, indicating whether to receive packets from a neighbor to the left, above, or right, in some such implementations), with the first two bits representing the register values for the first processing element; the next two bits representing the register values for the second processing element; etc. Each processing element may receive the configuration packet, set its own register according to its designated bits, and forward the packet out all of its outputs, as with a normal packet. Thus, the packet cascades through the array, reaching every processing element quickly. Additionally, while the configuration packet is processed differently than a normal packet, it is distributed through the array in the same manner as a standard packet, and therefore requires no special hardware or interfaces.

Figure 2A:
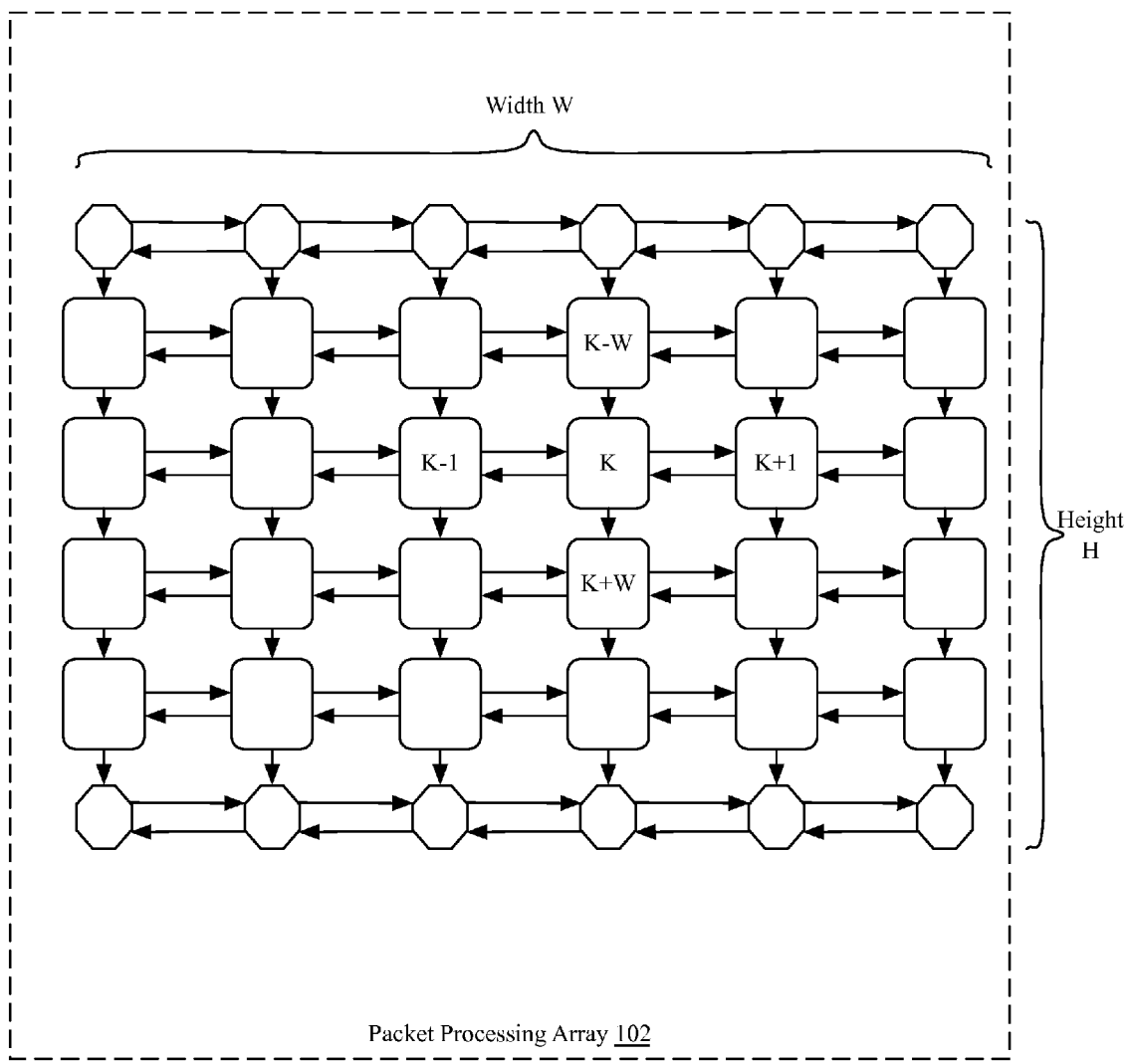
FIG. 2A is another block diagram of the implementation of a dynamically configurable packet processing array of FIG. 1B.

FIG. 2A is another block diagram of the implementation of a dynamically configurable packet processing array 102 of FIG. 1B, illustrating an array of processing elements and routers having a width W and a height H. The array accordingly includes W input routers, W*(H−2) processing elements, and W output routers, as shown. Given a processing element, not at an edge of the array, with index K, the neighboring elements have index K−1 (to the left), K+1 to the right, K−W above, and K+W below (in the example illustrated with W=6 and H=5, K=16).

Figure 2B:
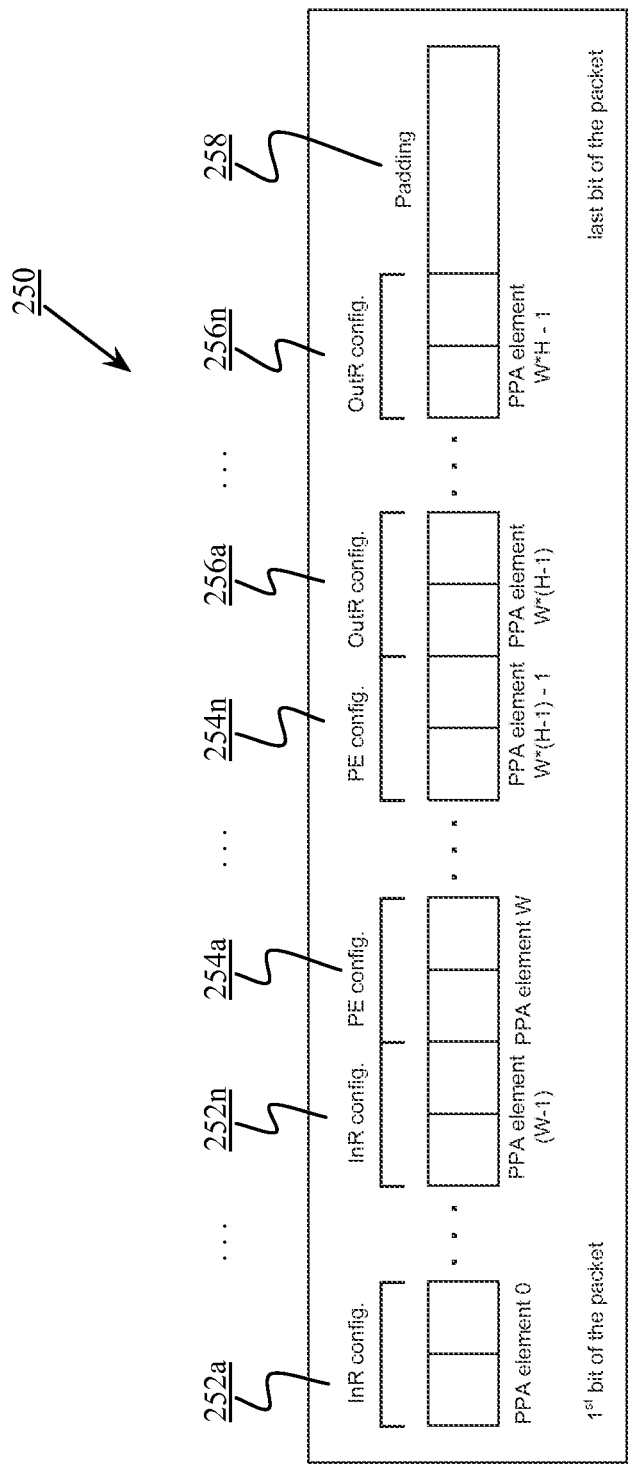
FIG. 2B is a diagram of topology reconfiguration packet, according to one implementation.

FIG. 2B is a diagram of topology reconfiguration packet 250, according to one implementation. In some implementations, the packet 250 may include additional headers and/or footers or other fields, and may include the fields shown within a data payload. The packet 250 may be encapsulated within another packet protocol, or may be provided unencapsulated or as raw data. As shown, the packet 250 may include two bits per element of the array (for implementations with two-dimensional arrays), including bit-pairs 252*a*-252*n* for input routing elements (having indices 0 through W−1); bit-pairs 254a-254n for processing elements (having indices W through W*(H−1)−1); and bit-pairs 256a-256n for output routing elements (having indices W*(H−1) through (W*H)−1). Depending on counting method, index values may instead start with 1, and be incremented accordingly. The bit-pairs may have predetermined values indicating whether the element should accept packets from neighbors to the left, above, or right, such as:

0b00—input from top
    0b01—input from left
    0b10—input from right
    0b11—illegal Other predetermined values may be used, or in other implementations, bit-pairs may indicate whether packets should be provided to a specific neighbor. In other implementations using a three-dimensional array, the topology configuration packet may include three-bit strings for each processing element, additionally identifying inputs from fore and aft in the z-plane.

Figure 3A:
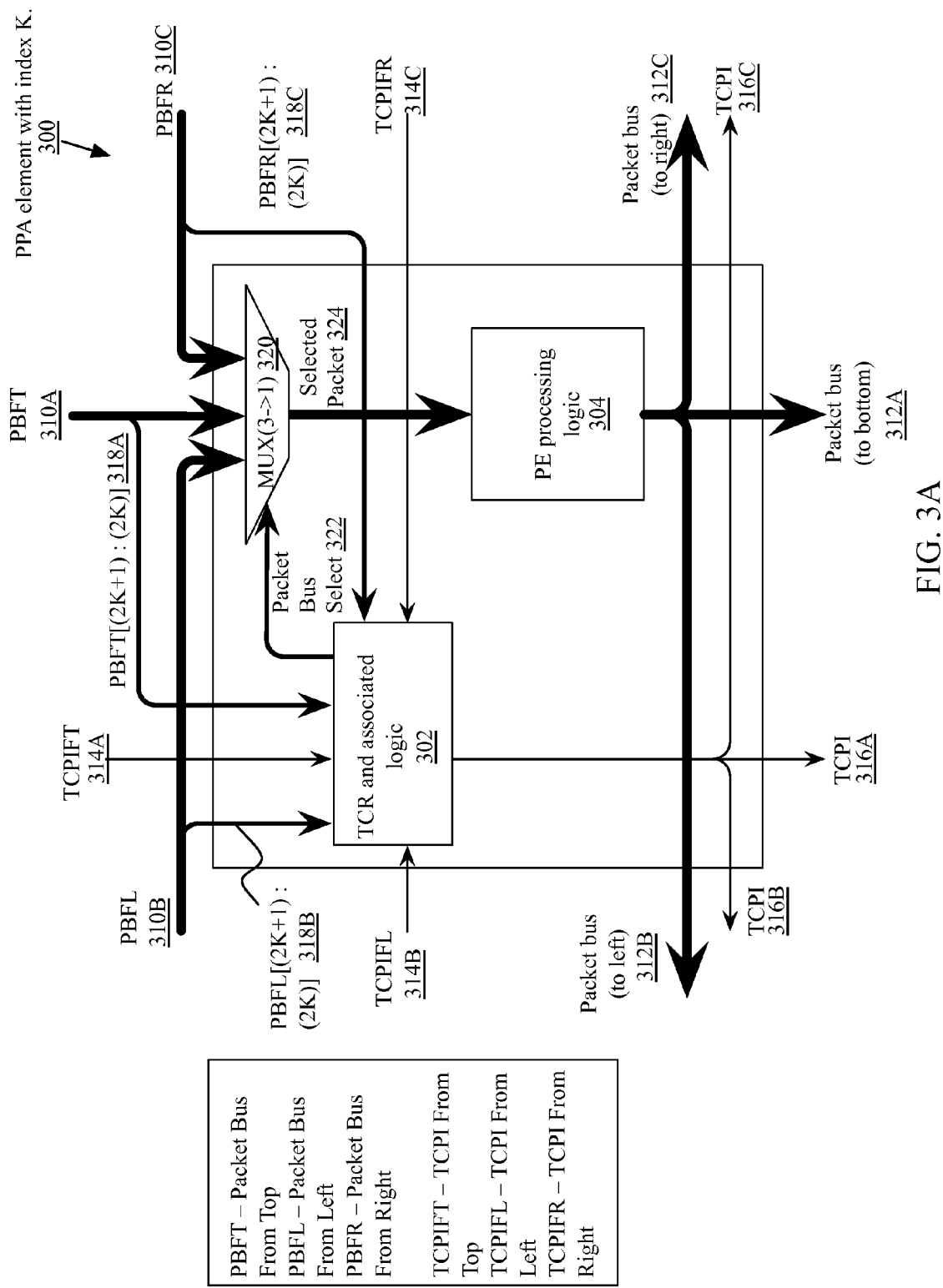
FIG. 3A is a block diagram of an implementation of a processing element within a packet processing array.

FIG. 3A is a block diagram of an implementation of a processing element 300 within a packet processing array 102. The processing element 300 may be an input router, processing element, or output router, as discussed above, with an identical configuration logic 302 and associated buses and multiplexing 306-324. Different processing elements 300 may have different processing logic 304 (e.g. logic for decompression, decryption, compression, encryption, filtering, scanning, analysis, routing, etc.) or may have identical processors that may be separately configurable.

As shown, the processing element 300 may connect to neighboring elements via packet busses 310, 312 (illustrated in thick lines). Incoming packet bus 310A connects to an output of a neighbor to the top, and incoming packet busses 310B and 310C connect to outputs of neighbors to the left and right, respectively. The incoming packets are provided to multiplexer 320 which selects a packet 324 to provide to processing logic 304, based on the packet bus select value 322 (e.g. the two-bit register values discussed above in connection with FIG. 2B). After the selected packet 324 is processed in processing logic 304, it is distributed simultaneously to neighbors to the bottom, left, and right via packet bus 312A, 312B, and 312C, respectively. Although shown with multiplexer 320 selecting from an incoming bus 310A-310C, in other implementations, a demultiplexer may selectively provide a processed packet to one of busses 312A-312C, as discussed above.

As discussed above, standard packets and topology configuration packets are both provided in the same manner via packet busses 310, 312. To distinguish these packets and enable the topology configuration logic 302 to reconfigure the element, topology configuration packet indicators may be provided as signals (e.g. high or low signals) on separate busses 314, 316. Similar to packet busses, topology configuration packet indicator busses may receive indicator signals from neighbors above, to the left, and to the right (busses 314A, 314B, and 314C, respectively); and may provide indicator signals to neighbors below, to the left, and to the right (busses 316A, 316B, and 316C, respectively). As discussed in more detail below, when a topology configuration packet is received from a neighbor, such as a neighbor to the left via packet bus 310B, the corresponding topology configuration packet indicator bus will also have an active signal (e.g. a high signal on bus 314B).

Busses 318A-318C provide the bit-pairs (or triplet, in three-dimensional array implementations) corresponding to the processing element's index value, or given index value K, pairs K*2+1:K*2. Each bus 318A-318C is connected to the corresponding two (or three, in other implementations) bits of the packet busses from the top, left, and right 310A-310C, and provided to the topology configuration logic 302. By connecting busses 318A-318C to the packet busses 310A-310C, rather than the selected packet bus 324, the topology configuration logic 302 may be identical in all of the processing elements in the array.

Responsive to the topology configuration indicator signal, the topology configuration logic 302 selects one of busses 314A-314C, and writes the incoming bits to a topology configuration register. This register value is provided as the bus select value 322 to multiplexer 320.

As shown, topology configuration packet indicator signals may be received from neighbors to the left or right or top, and are provided to the neighbors to the left and right and below. To prevent continuous propagation within a row of the array, the newly configured register value discussed above (e.g. 0b11) is applied one cycle later to disable the topology configuration packet indicator, and any topology configuration packet received from a neighbor element is ignored and not retransmitted.

Figure 3B:
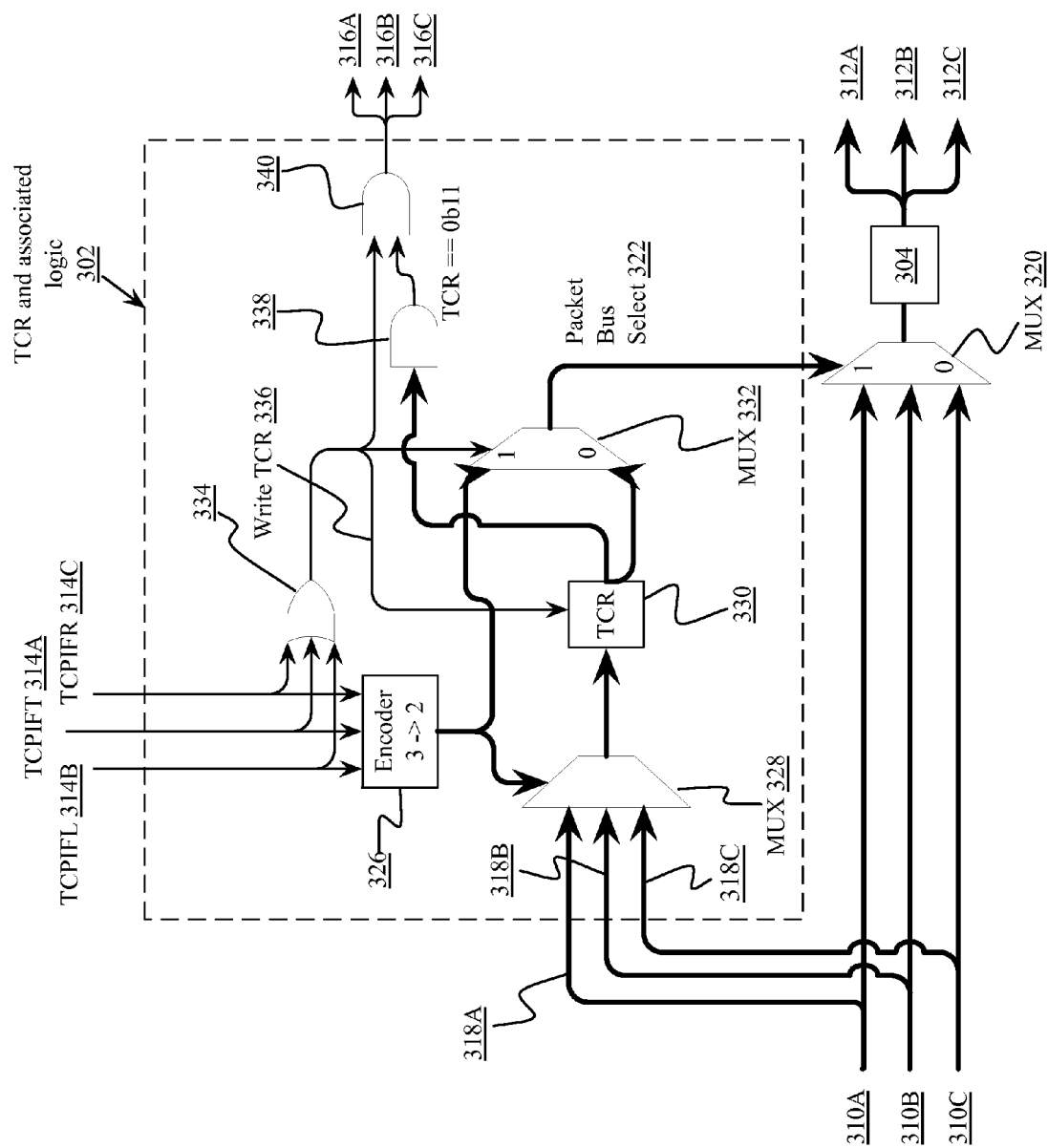
FIG. 3B is a block diagram of an implementation of topology configuration logic within a processing element of a packet processing array.

FIG. 3B is a block diagram of an implementation of topology configuration logic 302 within the processing element 300 of a packet processing array shown in FIG. 3A. As discussed above, busses 318A-318C are connected to bits of input packet busses 310A-310C corresponding to the index value for the processing element. These busses 318A-318C are provided to multiplexer 328. A topology configuration packet indicator signal is received from a neighbor to the top, left, or right via busses 314A-314C as discussed above, and provided to a 3 to 2 encoder 326. Encoder 326 outputs a two bit signal corresponding to the recipient input bus (e.g. 00, 01, or 10), which controls multiplexer 328. Accordingly, if a topology configuration packet indicator is received from a neighbor to the left on bus 314B as the topology configuration packet is received from the neighbor to the left on bus 310B, the bits for the configuration value on bus 318B will be selected by multiplexer 328 and stored in memory in the topology configuration register 330. Topology configuration register 330, which may be a volatile or non-volatile memory storage device, is write-enabled by a write TCR signal 336, received from OR gate 334 responsive to one of busses 314A-314C carrying the topology configuration signal.

Write TCR signal 336 is also provided to multiplexer 332, which selects between the output of encoder 326 (identifying the neighbor from which a topology configuration packet indicator was received) and the configuration stored in the topology configuration register 330. Accordingly, when write TCR signal 336 is low or off, multiplexer 332 provides the bus select value 322 stored in the register 330; when write TCR signal 336 is high or on, multiplexer 332 provides the bus select value 322 corresponding to the bus 310A-310C on which the topology configuration packet was received. The bus select value 322 thus controls multiplexer 320 to select the proper incoming bus and provide the packet to processing logic 304, while ignoring non-selected busses. During topology configuration, the processing logic 304 may be configured to ignore or not process the topology configuration packet. It may then be forwarded normally via output busses 312A-312C.

The value stored in topology configuration register 330 is also provided to AND gate 338. As discussed above, 0b11 may be considered an "illegal" value for the topology configuration register 330, not corresponding to any input bus 310A-310C. The register 330 may be reset to the 0b11 value during a reset or reboot of the device and/or packet processing array, or in preparation for reconfiguration of the array topology. Accordingly, AND gate 338 will be on or high before the topology configuration register 330 is configured with a proper or legal value, and off or low afterwards. The output of AND gate 338 is provided to AND gate 340 along with the write TCR signal 336. Accordingly, upon receipt of a topology configuration packet indicator and when the topology configuration register has not yet been reconfigured, the output of AND gate 340 is high and the topology configuration packet indicator is provided to the neighboring elements to the left, bottom, and right via busses 316A-316C. Once the topology configuration register is programmed to the desired value, the output of AND gate 340 stays low, preventing propagation echoes of the topology configuration packet indicator along the row of the array.

Figure 4A:
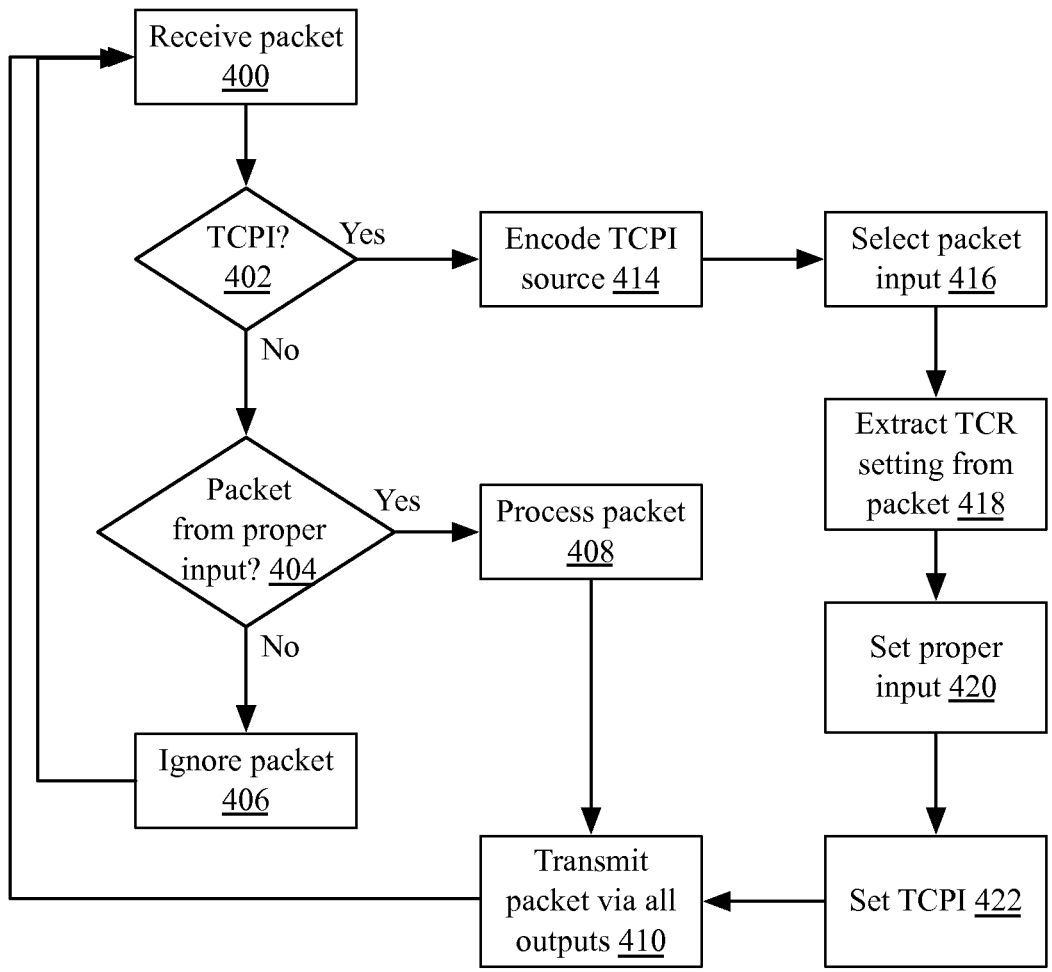
FIG. 4A is a flow chart of an implementation of a method for topology configuration of packet processing arrays via configuration packets.

FIG. 4A is a flow chart of an implementation of a method for topology configuration of packet processing arrays via configuration packets. At step 400, a packet may be received by a processing element via an input (if a first recipient element, such as an input router receiving the configuration packet) or bus from a neighboring element (if a subsequent recipient element). At step 402, if a topology configuration indicator signal is not active or on, then the packet may not be a configuration packet, but may instead be a standard packet for processing. At step 404, it may be determined (e.g. via a multiplexer), whether the packet is from a proper input or input from a neighbor identified in a topology configuration register. If not, at step 406, the packet may be ignored. If the packet is received on the identified input, at step 408, the packet may be processed normally by the processing element logic. At step 410, the processing element may transmit the packet via its outputs to neighboring elements.

At step 402, if a topology configuration indicator signal is active or on, then the packet may be a configuration packet. Accordingly, at step 414, the topology configuration indicator signal may be encoded as a bus select signal. A packet input may be selected at step 416, based on the encoded bus select signal. A topology configuration register setting may be extracted from the packet at step 418, and a topology configuration register set to a proper or selected input at step 420. At step 422, a topology configuration packet indicator may be transmitted to neighboring elements, and at step 410, the topology configuration packet may be transmitted to the neighboring elements.

Figure 4B:
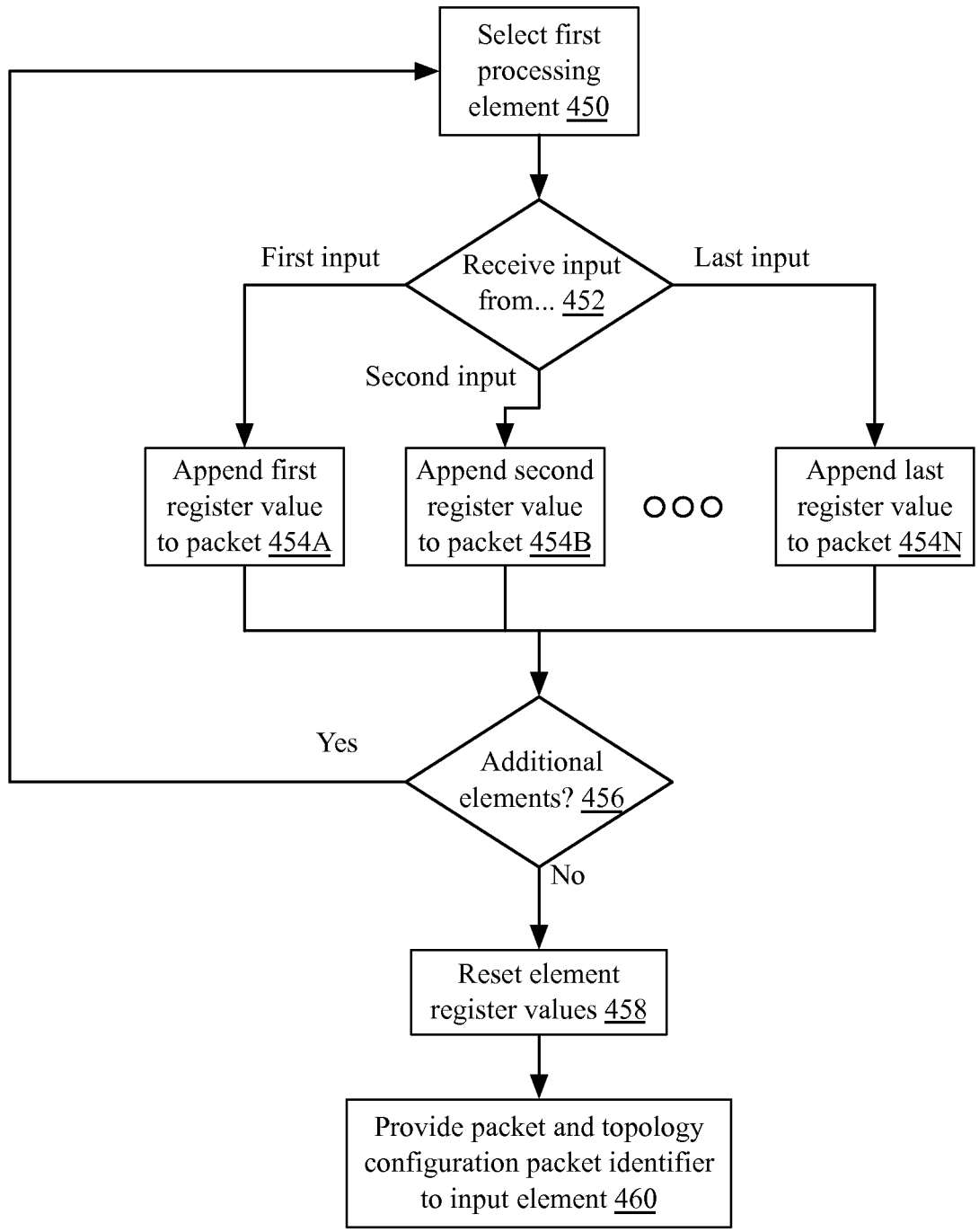
FIG. 4B is a flow chart of an implementation of a method for construction of topology configuration packets for packet processing arrays.

FIG. 4B is a flow chart of an implementation of a method for construction of topology configuration packets for packet processing arrays. The method may be executed by a topology configuration engine executed by a computing device, which may allow a user to determine a path for packet flow through the array. As discussed above, the packet flow may travel from each element to the left, right, and downwards, and in some implementations, forwards and backwards in a z-plane, and/or upwards. In some implementations, the flow may travel through the array multiple times, with an output of the array connected to an input of the array.

Once a configuration is set by a user or loaded from a configuration file, at step 450, a topology configuration engine may select a first processing element or router (e.g. an element at index 0 of the array). At step 452, the topology configuration engine may determine an input that the element should receive packets from. At step 454A-454N, a corresponding register value is appended to the configuration packet. As discussed above, in one implementation, the register value may be 0b00 for an input from the top, 0b01 for an input from the left, and 0b10 for an input from the right. In other implementations, other values may be used, and/or additional bits may be set to allow for three-dimensional arrays. At step 456, the topology configuration engine may determine if more processing elements exist in the array. If so, steps 450-456 may be repeated iteratively for each element. If not, then the packet may be complete. At step 458, the topology configuration registers for each processing element may be reset to a default value, such as 0b11. At step 460, the topology configuration packet and a topology configuration packet identifier may be provided to an input processing element of the array. As discussed above, the topology configuration packet may cascade through the array, with each processing element reconfiguring its topology configuration register according to its corresponding value in the packet and forwarding the packet, until all elements are configured.

Accordingly, in one aspect, the present disclosure is directed to a reconfigurable packet processing array, including a plurality of packet processing elements arranged in an array of packet processing elements. In such implementations, each packet processing element includes a plurality of packet input busses from a corresponding plurality of neighboring packet processing elements in the array of packet processing elements; a topology configuration packet detector, configured to determine that a packet received on one of the plurality of packet input busses is a topology configuration packet; a topology configuration register configured to store a packet bus selection value extracted from the received topology configuration packet, responsive to the determination; and a multiplexer, configured to select one of the plurality of packet input busses for receiving a subsequent packet for processing, based on the stored packet bus selection value in the topology configuration register.

In some implementations, each packet processing element further includes a plurality of packet output busses, configured to transmit each of the received topology configuration packet and subsequent packet to a second corresponding plurality of neighboring packet processing elements in the array of packet processing elements. In other implementations, the topology configuration packet detector of each packet processing element further includes a plurality of topology configuration packet indicator input busses from the corresponding plurality of neighboring packet processing elements in the array of packet processing elements. In a further implementation, the topology configuration packet detector of each packet processing element further includes an encoder configured to encode, as a binary value, an identification of a topology configuration packet indicator input bus on which a topology configuration packet indicator is received from a neighboring packet processing element. In still other implementations, the topology configuration packet detector of each packet processing element further includes a plurality of topology configuration packet indicator output busses to a second corresponding plurality of neighboring packet processing elements in the array of packet processing elements. In a further implementation, the topology configuration packet detector of each packet processing element is further configured to retransmit the topology configuration packet indicator via the plurality of topology configuration packet indicator output busses. In another further implementation, the topology configuration packet detector of each packet processing element is further configured to prevent retransmission of the topology configuration packet indicator via the plurality of topology configuration packet indicator output busses, responsive to a topology configuration register of the packet processing element having been set. In some implementations, the multiplexer is further configured to ignore a subsequent packet received on a packet input bus corresponding to a different packet bus selection value than the packet bus selection value stored in the topology configuration register.

In another aspect, the present disclosure is directed to a system for topology configuration of a packet processing array. The system includes a plurality of packet processing elements deployed in an array, each packet processing element configured to receive packets for processing from a first plurality of neighboring packet processing elements and output processed packets to a second plurality of neighboring packet processing elements. Each packet processing element further includes a topology configuration register configured to store an identification of one of the first plurality of neighboring packet processing elements, and a multiplexer configured to selectively accept a packet for processing from one of the first plurality of neighboring packet processing elements responsive to the value of the register. The topology configuration register of each packet processing element stores the identification based on a predetermined value received in a topology configuration packet provided to each of the plurality of packet processing elements.

In some implementations, the topology configuration register of each packet processing element is further configured store the identification of the one of the first plurality of neighboring packet processing elements based on a value of one or more predetermined bits corresponding to said packet processing element within the topology configuration packet. In other implementations, each packet processing element is further configured to receive an indicator of the topology configuration packet from one of the first plurality of neighboring packet processing elements and output the indicator of the topology configuration packet to the second plurality of neighboring packet processing elements. In a further implementation, each packet processing element is configured to receive the topology configuration packet from the one of the first plurality of neighboring packet processing elements that provided the indicator. In some implementations, each packet processing element further includes an encoder configured to generate an identification of the one of the first plurality of neighboring packet processing elements that provided the indicator. In a further implementation, each packet processing element further includes a second multiplexer configured to selectively receive the topology configuration packet from the one of the first plurality of neighboring packet processing elements that provided the indicator, based on the generated identification. In a still further implementation, the second multiplexer of each packet processing element is connected to predetermined bits of each of a plurality of input busses connected to the corresponding first plurality of neighboring packet processing elements. In another further implementation, each packet processing element further includes a third multiplexer configured to selectively provide the generated identification to the second multiplexer, responsive to receipt of the indicator of the topology configuration packet from one of the first plurality of neighboring packet processing elements. In other implementations, each packet processing element is further configured to output the indicator of the topology configuration packet to the second plurality of neighboring packet processing elements, responsive to the topology configuration register storing a default value, prior to storage of the identification of the one of the first plurality of neighboring packet processing elements. In still other implementations, each packet processing element is configured to provide the topology configuration packet to the second plurality of neighboring packet processing elements.

In still another aspect, the present disclosure is directed to a method for topology configuration of a packet processing array. The method includes iteratively, for each of a plurality of packet processing elements in an array of packet processing elements: selecting, by a topology configuration engine of a circuit, an input of a plurality of inputs of said packet processing element to be used for receiving packets in a specified configuration; generating, by the topology configuration engine, an identifier of the selected input for said packet processing element; and appending, by the topology configuration engine, the generated identifier to a topology configuration packet at a predetermined bit position corresponding to a position of said packet processing element within the array. The method also includes providing, by the topology configuration engine, the topology configuration packet to an input of the array of packet processing elements, each packet processing element extracting the generated identifier in the topology configuration packet at the predetermined bit position corresponding to the position of said packet processing element within the array, and providing the extracted identifier to a multiplexer of the packet processing element. In another implementation, each packet processing element further provides the topology configuration packet to one or more neighboring packet processing elements of the array.

B. Computing and Network Environment

Figure 5A:
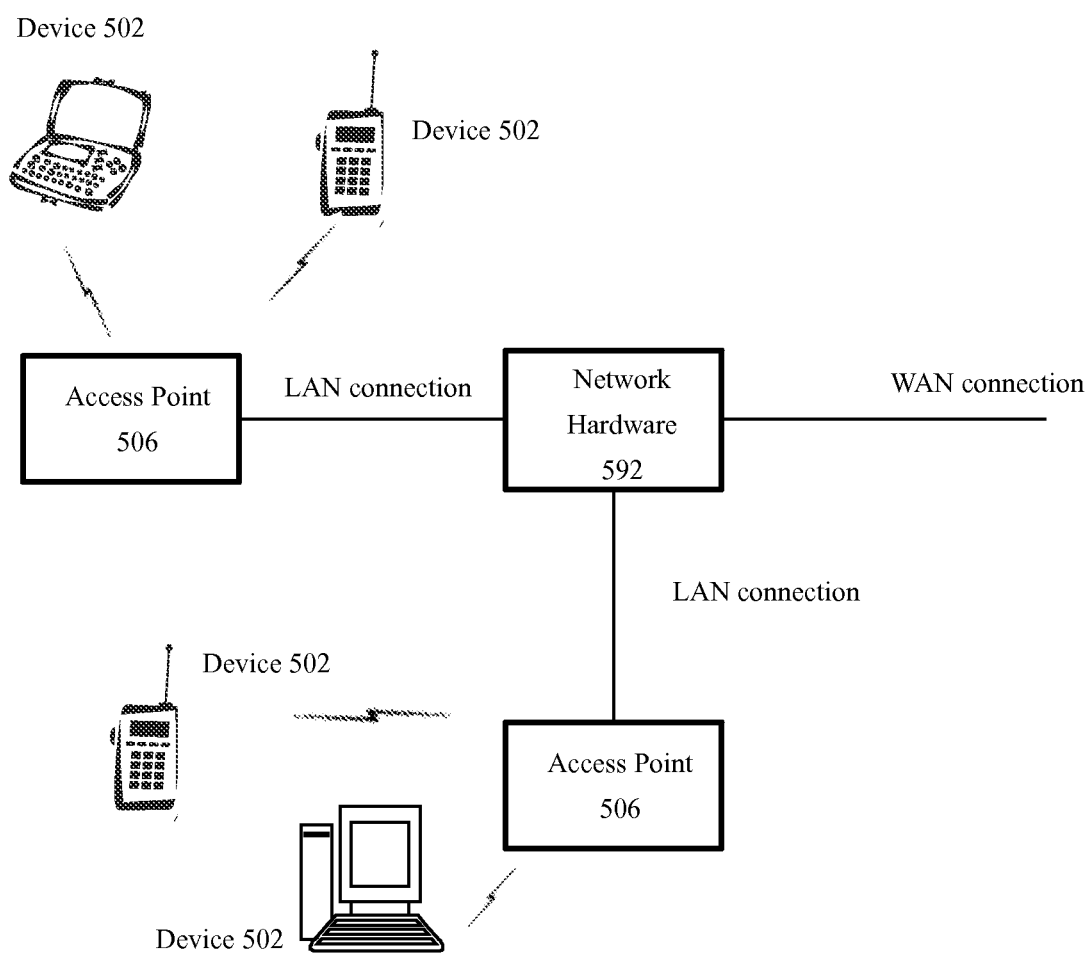
FIG. 5A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 5A, an embodiment of a network environment is depicted. In brief overview, the network environment includes a wireless communication system that includes one or more access points 506, one or more wireless communication devices 502 and a network hardware component 592. The wireless communication devices 502 may for example include laptop computers 502, tablets 502, personal computers 502 and/or cellular telephone devices 502. The details of an embodiment of each wireless communication device and/or access point are described in greater detail with reference to FIGS. 5B and 5C. The network environment can be an ad hoc network environment, an infrastructure wireless network environment, a subnet environment, etc. in one embodiment The access points (APs) 506 may be operably coupled to the network hardware 592 via local area network connections. The network hardware 592, which may include a router, gateway, switch, bridge, modem, system controller, appliance, etc., may provide a local area network connection for the communication system. Each of the access points 506 may have an associated antenna or an antenna array to communicate with the wireless communication devices 502 in its area. The wireless communication devices 502 may register with a particular access point 506 to receive services from the communication system (e.g., via a SU-MIMO or MU-MIMO configuration). For direct connections (e.g., point-to-point communications), some wireless communication devices 502 may communicate directly via an allocated channel and communications protocol. Some of the wireless communication devices 502 may be mobile or relatively static with respect to the access point 506.

In some embodiments an access point 506 includes a device or module (including a combination of hardware and software) that allows wireless communication devices 502 to connect to a wired network using Wi-Fi, or other standards. An access point 506 may sometimes be referred to as an wireless access point (WAP). An access point 506 may be configured, designed and/or built for operating in a wireless local area network (WLAN). An access point 506 may connect to a router (e.g., via a wired network) as a stand-alone device in some embodiments. In other embodiments, an access point can be a component of a router. An access point 506 can provide multiple devices 502 access to a network. An access point 506 may, for example, connect to a wired Ethernet connection and provide wireless connections using radio frequency links for other devices 502 to utilize that wired connection. An access point 506 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 506 may be used for (e.g., in-home or in-building) wireless networks (e.g., IEEE 802.11, Bluetooth, ZigBee, any other type of radio frequency based network protocol and/or variations thereof). Each of the wireless communication devices 502 may include a built-in radio and/or is coupled to a radio. Such wireless communication devices 502 and/or access points 506 may operate in accordance with the various aspects of the disclosure as presented herein to enhance performance, reduce costs and/or size, and/or enhance broadband applications. Each wireless communication devices 502 may have the capacity to function as a client node seeking access to resources (e.g., data, and connection to networked nodes such as servers) via one or more access points 506.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 5B:
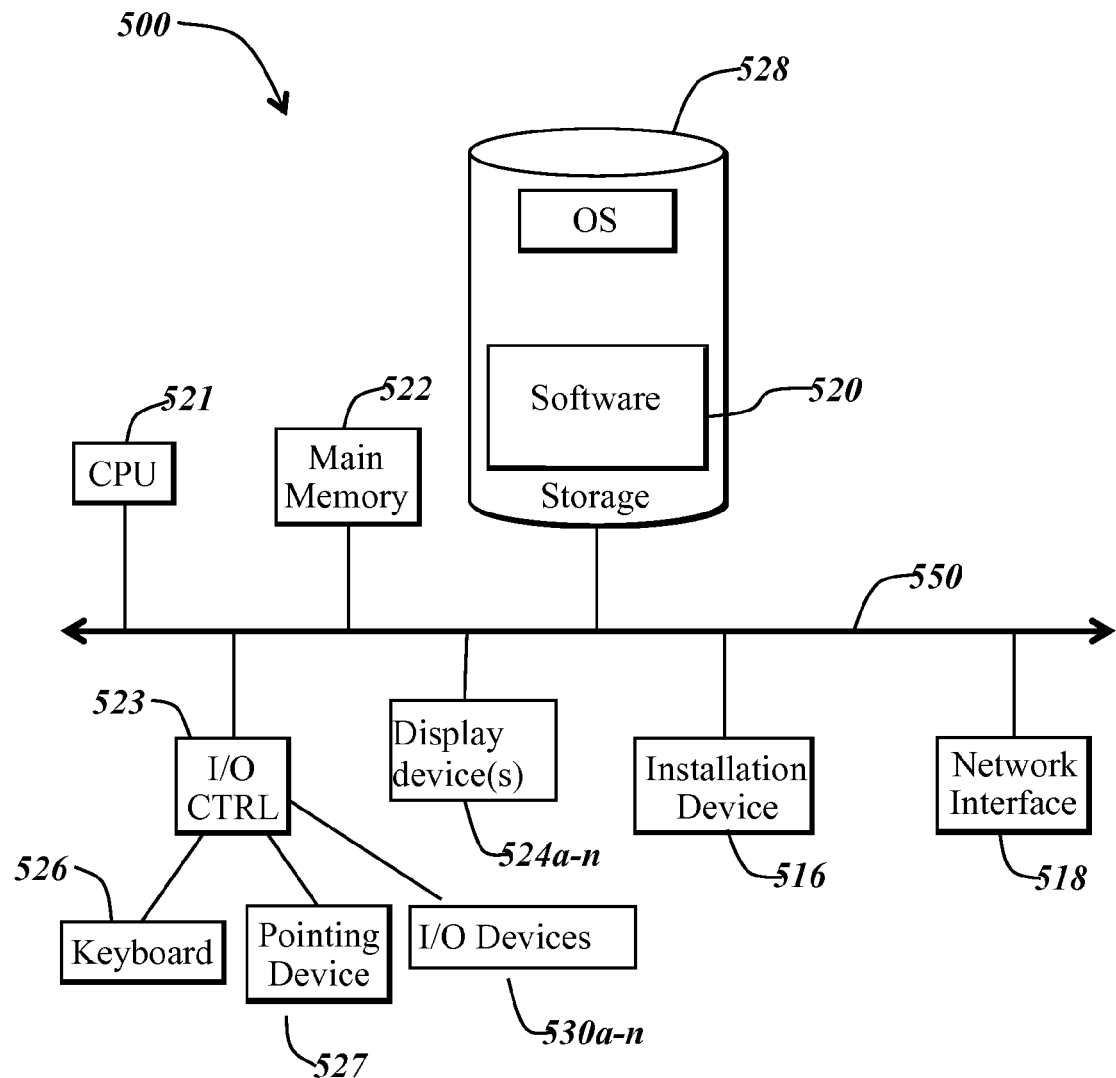
FIGS. 5B and 5C are block diagrams depicting embodiments of computing devices useful in connection with the methods and systems described herein.
Figure 5C:
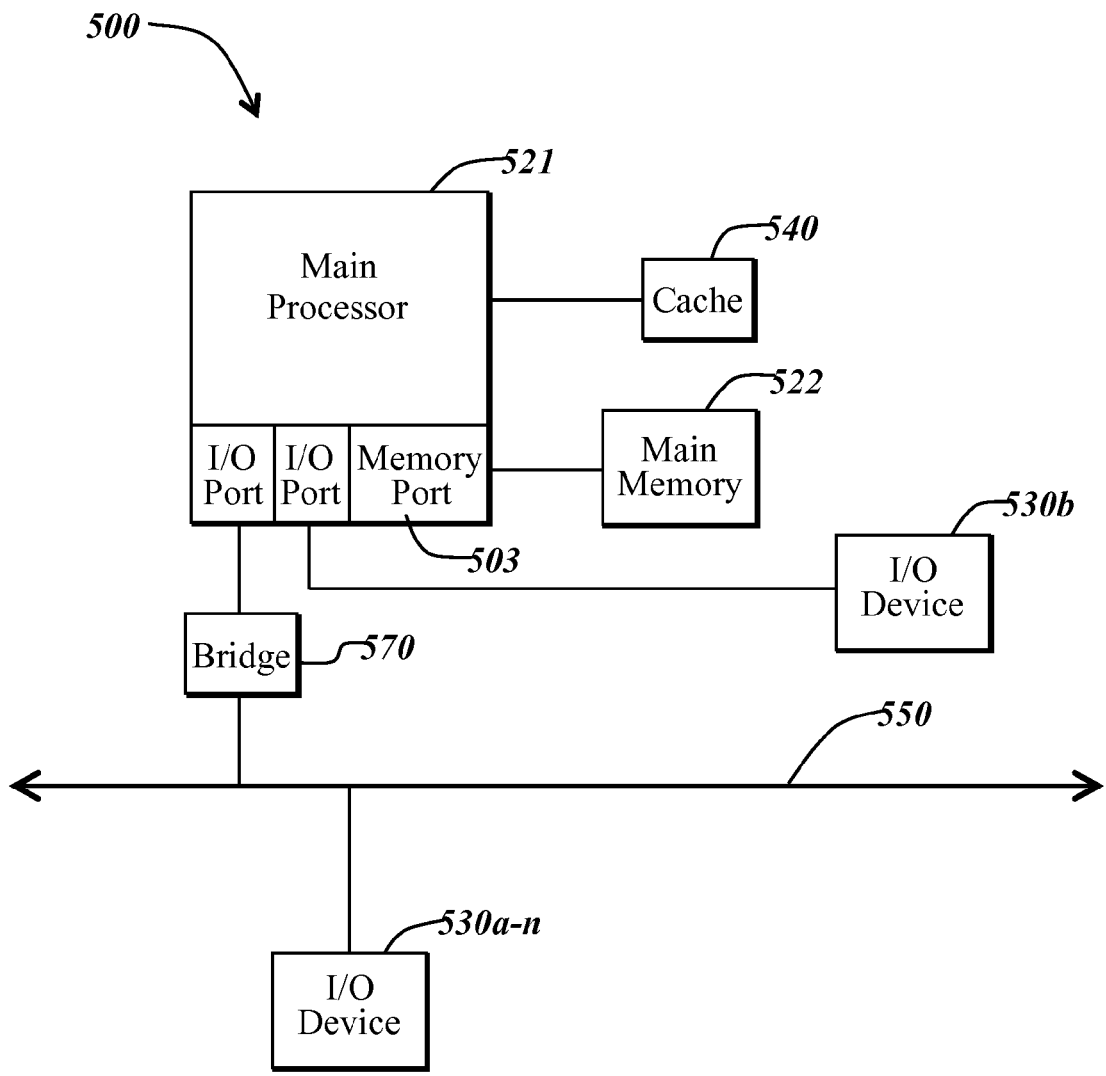

The communications device(s) 502 and access point(s) 506 may be deployed as and/or executed on any type and form of computing device, such as a computer, network device or appliance capable of communicating on any type and form of network and performing the operations described herein. FIGS. 5B and 5C depict block diagrams of a computing device 500 useful for practicing an embodiment of the wireless communication devices 502 or the access point 506. As shown in FIGS. 5B and 5C, each computing device 500 includes a central processing unit 521, and a main memory unit 522. As shown in FIG. 5B, a computing device 500 may include a storage device 528, an installation device 516, a network interface 518, an I/O controller 523, display devices 524a-524n, a keyboard 526 and a pointing device 527, such as a mouse. The storage device 528 may include, without limitation, an operating system and/or software. As shown in FIG. 5C, each computing device 500 may also include additional optional elements, such as a memory port 503, a bridge 570, one or more input/output devices 530a-530n (generally referred to using reference numeral 530), and a cache memory 540 in communication with the central processing unit 521.

The central processing unit 521 is any logic circuitry that responds to and processes instructions fetched from the main memory unit 522. In many embodiments, the central processing unit 521 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 500 may be based on any of these processors, or any other processor capable of operating as described herein.

Main memory unit 522 may be one or more memory chips capable of storing data and allowing any storage location to be directly accessed by the microprocessor 521, such as any type or variant of Static random access memory (SRAM), Dynamic random access memory (DRAM), Ferroelectric RAM (FRAM), NAND Flash, NOR Flash and Solid State Drives (SSD). The main memory 522 may be based on any of the above described memory chips, or any other available memory chips capable of operating as described herein. In the embodiment shown in FIG. 5B, the processor 521 communicates with main memory 522 via a system bus 550 (described in more detail below). FIG. 5C depicts an embodiment of a computing device 500 in which the processor communicates directly with main memory 522 via a memory port 503. For example, in FIG. 5C the main memory 522 may be DRDRAM.

FIG. 5C depicts an embodiment in which the main processor 521 communicates directly with cache memory 540 via a secondary bus, sometimes referred to as a backside bus. In other embodiments, the main processor 521 communicates with cache memory 540 using the system bus 550. Cache memory 540 typically has a faster response time than main memory 522 and is provided by, for example, SRAM, BSRAM, or EDRAM. In the embodiment shown in FIG. 5C, the processor 521 communicates with various I/O devices 530 via a local system bus 550. Various buses may be used to connect the central processing unit 521 to any of the I/O devices 530, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the processor 521 may use an Advanced Graphics Port (AGP) to communicate with the display 524. FIG. 5C depicts an embodiment of a computer 500 in which the main processor 521 may communicate directly with I/O device 530b, for example via HYPERTRANSPORT, RAPIDIO, or INFINIBAND communications technology. FIG. 5C also depicts an embodiment in which local busses and direct communication are mixed: the processor 521 communicates with I/O device 530a using a local interconnect bus while communicating with I/O device 530b directly.

A wide variety of I/O devices 530a-530n may be present in the computing device 500. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 523 as shown in FIG. 5B. The I/O controller may control one or more I/O devices such as a keyboard 526 and a pointing device 527, e.g., a mouse or optical pen. Furthermore, an I/O device may also provide storage and/or an installation medium 516 for the computing device 500. In still other embodiments, the computing device 500 may provide USB connections (not shown) to receive handheld USB storage devices such as the USB Flash Drive line of devices manufactured by Twintech Industry, Inc. of Los Alamitos, Calif.

Referring again to FIG. 5B, the computing device 500 may support any suitable installation device 516, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 500 may further include a storage device, such as one or more hard disk drives or redundant arrays of independent disks, for storing an operating system and other related software, and for storing application software programs such as any program or software 520 for implementing (e.g., configured and/or designed for) the systems and methods described herein. Optionally, any of the installation devices 516 could also be used as the storage device. Additionally, the operating system and the software can be run from a bootable medium.

Furthermore, the computing device 500 may include a network interface 518 to interface to the network 504 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11 ad, CDMA, GSM, WiMax and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

In some embodiments, the computing device 500 may include or be connected to one or more display devices 524a-524n. As such, any of the I/O devices 530a-530n and/or the I/O controller 523 may include any type and/or form of suitable hardware, software, or combination of hardware and software to support, enable or provide for the connection and use of the display device(s) 524a-524n by the computing device 500. For example, the computing device 500 may include any type and/or form of video adapter, video card, driver, and/or library to interface, communicate, connect or otherwise use the display device(s) 524a-524n. In one embodiment, a video adapter may include multiple connectors to interface to the display device(s) 524a-524n. In other embodiments, the computing device 500 may include multiple video adapters, with each video adapter connected to the display device(s) 524a-524n. In some embodiments, any portion of the operating system of the computing device 500 may be configured for using multiple displays 524a-524n. One ordinarily skilled in the art will recognize and appreciate the various ways and embodiments that a computing device 500 may be configured to have one or more display devices 524a-524n.

In further embodiments, an I/O device 530 may be a bridge between the system bus 550 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 500 of the sort depicted in FIGS. 5B and 5C may operate under the control of an operating system, which control scheduling of tasks and access to system resources. The computing device 500 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 500 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 500 has sufficient processor power and memory capacity to perform the operations described herein.

In some embodiments, the computing device 500 may have different processors, operating systems, and input devices consistent with the device. For example, in one embodiment, the computing device 500 is a smart phone, mobile device, tablet or personal digital assistant. In still other embodiments, the computing device 500 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A reconfigurable packet processing array, comprising:
a plurality of packet processing elements arranged in an array of packet processing elements, each packet processing element comprising:
a plurality of packet input busses from a corresponding plurality of neighboring packet processing elements in the array of packet processing elements,
a topology configuration packet detector, configured to determine that a packet received on one of the plurality of packet input busses is a topology configuration packet,
a topology configuration register configured to store a packet bus selection value extracted from the received topology configuration packet, responsive to the determination, and
a multiplexer, configured to select one of the plurality of packet input busses for receiving a subsequent packet for processing, based on the stored packet bus selection value in the topology configuration register.

2. The reconfigurable packet processing array of claim 1, wherein each packet processing element further comprises a plurality of packet output busses, configured to transmit each of the received topology configuration packet and subsequent packet to a second corresponding plurality of neighboring packet processing elements in the array of packet processing elements.

3. The reconfigurable packet processing array of claim 1, wherein the topology configuration packet detector of each packet processing element further comprises a plurality of topology configuration packet indicator input busses from the corresponding plurality of neighboring packet processing elements in the array of packet processing elements.

4. The reconfigurable packet processing array of claim 3, wherein the topology configuration packet detector of each packet processing element further comprises an encoder configured to encode, as a binary value, an identification of a topology configuration packet indicator input bus on which a topology configuration packet indicator is received from a neighboring packet processing element.

5. The reconfigurable packet processing array of claim 3, wherein the topology configuration packet detector of each packet processing element further comprises a plurality of topology configuration packet indicator output busses to a second corresponding plurality of neighboring packet processing elements in the array of packet processing elements.

6. The reconfigurable packet processing array of claim 5, wherein the topology configuration packet detector of each packet processing element is further configured to retransmit the topology configuration packet indicator via the plurality of topology configuration packet indicator output busses.

7. The reconfigurable packet processing array of claim 5, wherein the topology configuration packet detector of each packet processing element is further configured to prevent retransmission of the topology configuration packet indicator via the plurality of topology configuration packet indicator output busses, responsive to a topology configuration register of the packet processing element having been set.

8. The reconfigurable packet processing array of claim 1, wherein the multiplexer is further configured to ignore a subsequent packet received on a packet input bus corresponding to a different packet bus selection value than the packet bus selection value stored in the topology configuration register.

9. A system for topology configuration of a packet processing array, comprising:
a plurality of packet processing elements deployed in an array, each packet processing element configured to receive packets for processing from a first plurality of neighboring packet processing elements and output processed packets to a second plurality of neighboring packet processing elements;
wherein each packet processing element further comprises:
a topology configuration register configured to store an identification of one of the first plurality of neighboring packet processing elements, and
a multiplexer configured to selectively accept a packet for processing from one of the first plurality of neighboring packet processing elements responsive to the value of the register;
wherein the topology configuration register of each packet processing element stores the identification based on a predetermined value received in a topology configuration packet provided to each of the plurality of packet processing elements.

10. The system of claim 9, wherein the topology configuration register of each packet processing element is further configured store the identification of the one of the first plurality of neighboring packet processing elements based on a value of one or more predetermined bits corresponding to said packet processing element within the topology configuration packet.

11. The system of claim 9, wherein each packet processing element is further configured to receive an indicator of the topology configuration packet from one of the first plurality of neighboring packet processing elements and output the indicator of the topology configuration packet to the second plurality of neighboring packet processing elements.

12. The system of claim 11, wherein each packet processing element is configured to receive the topology configuration packet from the one of the first plurality of neighboring packet processing elements that provided the indicator.

13. The system of claim 11, wherein each packet processing element further comprises an encoder configured to generate an identification of the one of the first plurality of neighboring packet processing elements that provided the indicator.

14. The system of claim 13, wherein each packet processing element further comprises a second multiplexer configured to selectively receive the topology configuration packet from the one of the first plurality of neighboring packet processing elements that provided the indicator, based on the generated identification.

15. The system of claim 14, wherein the second multiplexer of each packet processing element is connected to predetermined bits of each of a plurality of input busses connected to the corresponding first plurality of neighboring packet processing elements.

16. The system of claim 14, wherein each packet processing element further comprises a third multiplexer configured to selectively provide the generated identification to the second multiplexer, responsive to receipt of the indicator of the topology configuration packet from one of the first plurality of neighboring packet processing elements.

17. The system of claim 11, wherein each packet processing element is further configured to output the indicator of the topology configuration packet to the second plurality of neighboring packet processing elements, responsive to the topology configuration register storing a default value, prior to storage of the identification of the one of the first plurality of neighboring packet processing elements.

18. The system of claim 9, wherein each packet processing element is configured to provide the topology configuration packet to the second plurality of neighboring packet processing elements.

19. A method for topology configuration of a packet processing array, comprising:
  iteratively, for each of a plurality of packet processing elements in an array of packet processing elements:
    selecting, by a topology configuration engine of a circuit, an input of a plurality of inputs of said packet processing element to be used for receiving packets in a specified configuration,
    generating, by the topology configuration engine, an identifier of the selected input for said packet processing element, and
    appending, by the topology configuration engine, the generated identifier to a topology configuration packet at a predetermined bit position corresponding to a position of said packet processing element within the array; and
  providing, by the topology configuration engine, the topology configuration packet to an input of the array of packet processing elements, each packet processing element extracting the generated identifier in the topology configuration packet at the predetermined bit position corresponding to the position of said packet processing element within the array, and providing the extracted identifier to a multiplexer of the packet processing element.

20. The method of claim 19, wherein each packet processing element further provides the topology configuration packet to one or more neighboring packet processing elements of the array.

* * * * *